United States Patent [19]
Deming

[11] 3,965,847
[45] June 29, 1976

[54] SERVICE MINDER ODOMETER

[75] Inventor: Kenneth R. Deming, Flint, Mich.

[73] Assignee: General Motors Corporation, Detroit, Mich.

[22] Filed: Apr. 3, 1975

[21] Appl. No.: 564,712

[52] U.S. Cl. .......................... 116/114 W; 235/95 R; 235/96
[51] Int. Cl.² .................. G01C 22/00; G01D 13/00
[58] Field of Search .................. 235/95 R, 95 B, 96; 116/114 W, 129 R

[56] References Cited
UNITED STATES PATENTS

| | | | |
|---|---|---|---|
| 1,671,553 | 5/1928 | Sheldrick | 235/96 X |
| 1,948,427 | 2/1934 | Moecker | 116/114 W X |
| 2,087,093 | 7/1937 | Marquart | 235/95 R X |
| 2,493,437 | 1/1950 | Berry | 116/114 W |
| 2,578,358 | 12/1951 | Jellison | 235/95 R X |
| 2,589,623 | 3/1952 | Merritt et al. | 235/95 R X |
| 2,601,838 | 7/1952 | Boates | 116/114 W |
| 3,482,773 | 12/1969 | Hachtel | 235/95 R |
| 3,598,309 | 8/1971 | Engler et al. | 235/95 B |
| 3,785,551 | 1/1974 | Regan | 235/95 R |
| 3,812,331 | 5/1974 | Woodward | 235/95 R |

Primary Examiner—L. T. Hix
Assistant Examiner—Stanley J. Witkowski
Attorney, Agent, or Firm—K. H. MacLean, Jr.

[57] ABSTRACT

An odometer assembly having a shaft on which a plurality of numbered counting wheels are mounted for rotation and including a rotatable service indicator wheel supported on the shaft next to the highest order counting wheel for rotation therewith until a flag portion which overlays the indicator wheel becomes visible to the vehicle operator. A drive mechanism between the service indicator wheel and the highest order counting wheel couples the wheels together for the aforementioned rotation and thereafter permits the highest order counting wheel to rotate with respect to the service indicator wheel. A rotatable reset lever means is also provided to counter-rotate the service indicator wheel back to its original non-indicating position.

3 Claims, 4 Drawing Figures

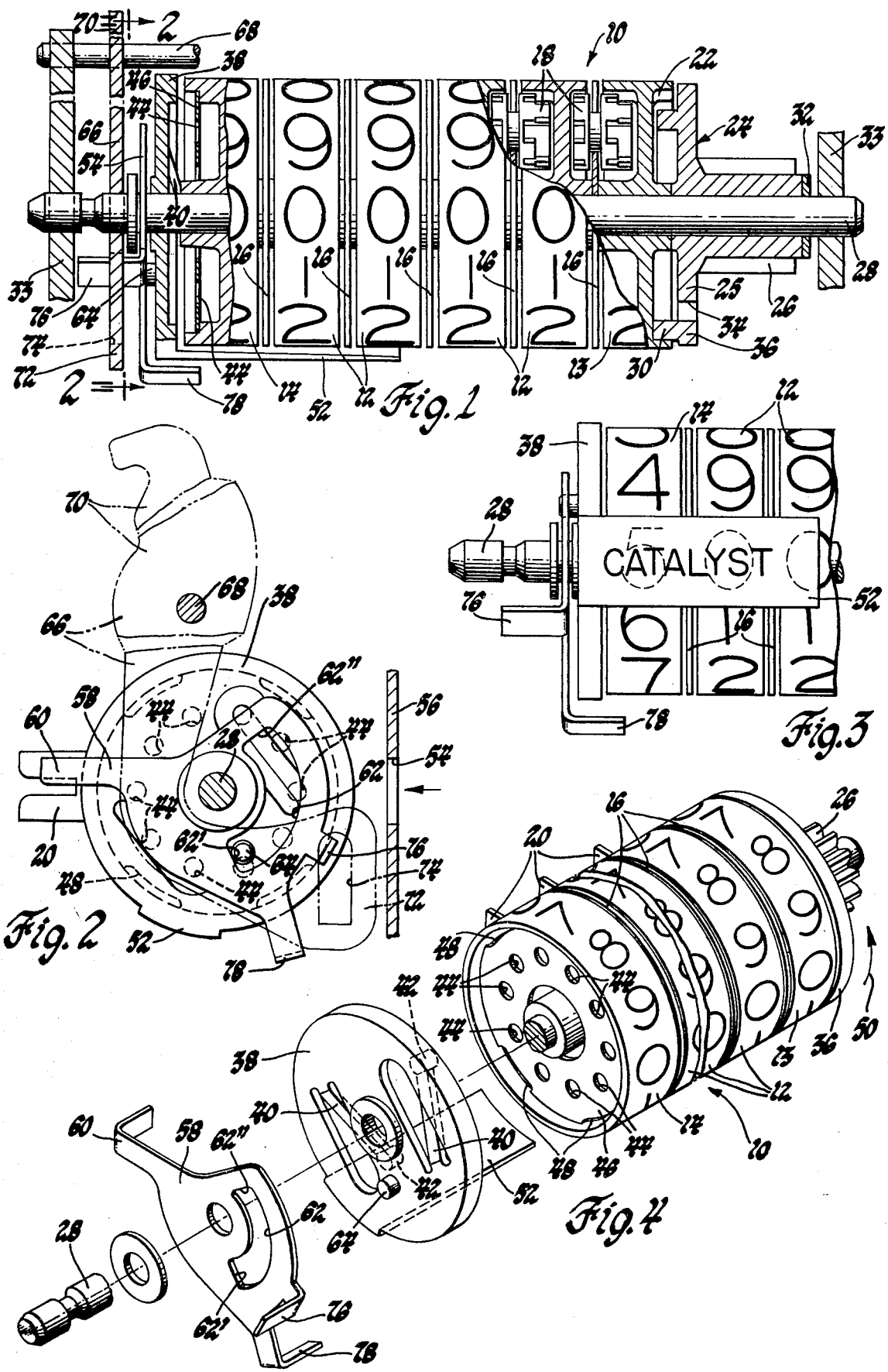

SERVICE MINDER ODOMETER

This invention relates to an odometer assembly having service indicating means which is rotated in response to predetermined mileage intervals into a position in which a flag portion is visible to the vehicle operator.

The subject invention is an improved version of the odometer assembly disclosed in U.S. Pat. No. 3,667,671 to Hachtel which issued June 6, 1972. The subject improved odometer assembly provides a simple and economical, yet reliable, means to provide a visual service reminder at periodic mileage intervals. Prior art odometers of this type have employed complicated and expensive mechanisms to provide service reminders. The present invention includes only a few parts in addition to the basic odometer mechanism found in modern automobiles.

Present day odometer assemblies utilize a plurality of numbered counting wheels mounted upon a common shaft. The lowest order counting wheel is driven at a speed proportional to vehicle travel. The other counting wheels are progressively rotated at decreasing rates to indicate the units, tens, hundredths, thousandths and ten thousandths portion of the odometer reading. The subject service-indicating odometer assembly includes a separate service indicator wheel mounted on the shaft adjacent the highest order counting wheel. A flag portion which extends from the service indicator wheel in overlying relation to the odometer assembly is moved into a visible position by rotation of the highest order counting wheel and the interconnected service indicator wheel. The connecting drive mechanism between the service indicator wheel and the highest order counting wheel includes integrally molded wiper springs which extend from the indicator wheel in a tangential and axial direction toward the highest order counting wheel. The ends of the wiper springs engage circumferentially spaced dimples or holes associated with the highest order counting wheel to provide a positive connection therebetween. When the service indicating wheel is rotated so that the flag portion is visible, stop means are provided to prevent further rotation of the indicator wheel and to permit the highest order counting wheel to continue its rotation with respect to the indicator wheel. During this further rotation of the counting wheel, the ends of the wiper spring disengage from the spaced dimples in the highest order counting wheel.

The limited rotative travel of the service indicator wheel is provided by interaction between the indicator wheel and a stop washer member supported adjacent the indicator wheel. After the indicator wheel has rotated into the position in which the flag portion is visible, a reset lever is manually activated to counter-rotate the stop washer and interconnected indicator wheel back to its initial position.

An advantage of this improved odometer assembly with a service indicator is its compact and simple structure. Its compatability with the structure of many commercially available odometers is another desirable feature. Only a relatively few additional parts need be added to commercially available odometers to provide a service indicating function which is both durable and reliable.

The aforementioned advantages and other advantages of the invention will be more readily apparent from the following detailed description, reference being had to the accompanying drawings wherein:

FIG. 1 is a partially sectioned elevational view of the subject service indicating odometer;

FIG. 2 is a view looking in the direction of arrows 2—2 in FIG. 1, which shows the end of the odometer assembly and a portion of the instrument panel assembly;

FIG. 3 is a fragmentary view similar to FIG. 1 wherein the indicator wheel has been rotated in response to a predetermined mileage interval into a position wherein a service indication is visible through the window in the instrument panel shown in FIG. 2;

FIG. 4 is a perspective view of the service minder odometer assembly showing the indicator wheel and reset mechanism disassembled from the counting wheels of the odometer.

A mileage counter device or odometer 10, is shown in the drawings having a number of counting wheels 12, 13 and 14. Partition plates 16 are located between adjacent counting wheels which serve as carrier means for pinion gears therebetween. The structure of the partition plates and the pinion gears are not shown in detail in the drawings but reference is hereby made to U.S. Pat. No. 3,137,444 to Harada which issued June 16, 1964. As disclosed in the Harada patent, pinion gears 18 are rotated within notches in the partition plates in response to rotation of the counting wheel to the right of the partition plate. The rotation of the pinion gear rotates the counting wheel located to the left of the partition plate one-tenth of a revolution for each full revolution of the rightward counting wheel. A notched tongue 20 formed on each partition plate 16 is held by a portion of the odometer housing (not shown) to prevent rotation of the partition plates 16.

The counting wheel 13 located furthest to the right in FIG. 1 is the lowest order counting wheel and rotates at a rate which corresponds to one tenth of a mile intervals. The lowest order counting wheel has gear teeth 22 formed thereon defining a sun gear around the inner edge of the wheel. A drive mechanism 24 rotates wheel 13 and includes a drive plate 25 which has an integrally formed gear 26 thereon. The plate 25 has a drive tooth 30 which engages the gear teeth 22. A retaining washer 32 is located between plate 25 and a portion 33 of the odometer frame which supports one end of shaft 28.

As is pointed out in more detail in the Harada patent, the drive plate 25 is slotted or undercut as at 34 in FIG. 1 to form a flexible arm 36 as an integral part thereof. The tooth 30 is formed at the end of arm 36 and extends radially from drive plate 25 to engage the gear teeth 22. During a normal forward drive operation, the tooth 30 engages gear teeth 22 to rotate the counting wheels 13 in a direction which progressively exposes the numerals implanted on the circumference of the counting wheel into a visible position occupied by the numeral 0 in FIGS. 1, 3. For further details regarding the drive mechanism 24, reference is hereby made to the earlier identified Hachtel patent. The aforedescribed drive structure rotates the wheel 13 at a rate corresponding to tenths of a mile. Accordingly, the wheel to the left in FIG. 1 is rotated at a rate corresponding to unit miles of vehicle travel. The wheels progressively to the left indicate 10-mile intervals, 100-mile intervals, 1000-mile intervals, and 10,000 mile intervals.

A service indicator wheel 38 is located adjacent the highest order counting wheel (10,000-mile intervals)

14 and it is rotatable upon shaft 28. The indicator wheel 38, as shown best in FIG. 4, has integrally molded wiper springs 40 formed therein. The wiper springs 40 extend in a tangential and axial direction from the substantially flat body of indicator wheel 38. The ends of the wiper springs 40 are enlarged to form nibs 42 which are adapted to engage holes or dimples 44 formed in a disc 46. The disc 46 is attached for rotation to the counting wheel 14 by engagement between circumferentially spaced indentations 48 on the disc and similarly configured projections on the wheel 14. There are ten circumferentially spaced holes 44 in the plate 46 for engagement with the nibs 42 to interconnect the indicator wheel 38 and the wheel 14 for rotation together. As an alternate construction, the holes or dimples 44 may be carried directly on the counting wheel 14. This alternate structure eliminates the separate disc 46.

As the counting wheel 14 is rotated in the direction indicated by arrow 50, the wheel 38 is rotated by the interaction between nibs 42 and openings 44. A flag portion 52 which is integrally formed with the indicator wheel 38 extends in an axial direction in overlying relation to the cylindrical surface of the odometer assembly 10. As wheel 38 is rotated with counting wheel 14, the flag portion 52 is moved from the initial operative position shown in FIGS. 1, 2 to a second operative position shown in FIG. 3. The movement of portion 52 to the second operational position corresponding to 50,000 miles in FIG. 3 exposes the service indication thereon to the vehicle operator. Specifically, the flag portion 52 and a printed indication thereon are visible to a vehicle operator through a window 54 in an odometer or instrument panel 56 as shown in FIG. 2.

Rotation of the wheel 38 between its two operative positions is controlled by a stop washer 58. Washer 58 has a portion 60 extending therefrom which normally is aligned with notched tongue 20 to engage the odometer assembly frame and hold the stop washer 58 in the position shown in FIG. 2. An elongated opening 62 in the stop washer 58 has end portions 62' and 62'' which engage a portion 64 extending from wheel 38. Engagement between portions 62', 62'' and 64 limits the angular rotation of wheel 38 from the first operative position to the second operative position. After the wheel 38 has rotated into its second operative position so as to expose flag portion 52 to the vehicle operator, the projection 64 will then be located at the top of the opening 62 adjacent end 62''. This limits further annular rotation of the wheel 38 and maintains the flag portion 52 in its second operational position. After movement of the indicator wheel 38 to its second operational position, the highest order counting wheel 14 continues to rotate with respect to wheel 38 by disengagement between ends 42 and holes or dimples 44 as permitted by the flexible wiper springs or arms 40.

Reset means are provided to counter-rotate the wheel 38 back to its initial first operational position after the service operation indicated on flag 52 has been performed. A reset lever 66 is pivotally mounted upon a shaft 68, whose ends are supported by frame 33, as shown in FIG. 1. The lever 66 has an enlarged end portion 70 adapted to be manually pivoted about shaft 68 in a clockwise direction in FIG. 2. This pivotal movement causes the lower end 72 of the reset lever 66 to be moved downward and to the left in FIG. 2. An elongated opening in 74 in the end 72 of lever 66 surrounds a portion 76 extending from the stop washer 58.

The movement of lever 66 rotates the stop washer 58 in a clockwise direction in FIG. 2 and resultantly produces clockwise rotation of wheel 38 by engagement between end 62'' of opening 62 and portion 64 of wheel 38. During this resetting operation, the stop washer 58 rotates until an extended portion 78 engages the portion of the odometer frame which holds the notched tongues 20 of plates 16. Spring means (not shown) bias the lever 66 toward its initial position so that after a reset operation the stop washer 58 and wheel 38 are positioned as shown in FIG. 2 with wheel portion 64 at the bottom of opening 62.

The aforedescribed embodiment of the invention is a preferred embodiment, although other embodiments of the improved odometer assembly may be adapted without being outside the scope of the invention as defined in the following claims.

What is claimed is as follows:

1. In an odometer assembly of the type having multiple counting wheels rotatable upon a shaft in response to mileage intervals, service indicating means responsive to a predetermined rotation of one of the counting wheels to move a signal into a visible position, a rotatable indicating member mounted on said shaft adjacent said one counting wheel, a flag portion of said indicating member extending in overlying relation to said counting wheels, wiper spring means between said indicating member and said one counting wheel to produce rotative movement of the indicating member from a first operative position to a second operative position in which said flag portion is visible to an observer, said wiper spring means being integrally attached to said member at one end and extending in a radial and axial direction toward said one counting wheel, circumferentially spaced detent means in said one counting wheel engaged by a second end of said wiper spring means to interconnect said member and said one counting wheel for rotation together during movement between first and second operative positions, a stop washer mounted adjacent said indicating member having means operably engageable with said indicating member limiting rotation of said indicating member between said first and second operative positions whereby movement of said one counting wheel after rotation of said indicating member into its second operational position is permitted by flexing of said wiper spring means and resultant disengagement between its second end and said circumferentially spaced detent means, manually operated reset means including a lever for counter-rotating said stop washer and connected service indicating member in a direction corresponding to movement from the second operative position back to the first operative position.

2. In an odometer assembly of the type having multiple counting wheel members rotatable upon a shaft in response to mileage intervals, service indicating means responsive to a predetermined rotation of one of the counting wheel members to move a signal into a visible position, said service indicating means including an indicating member mounted for rotation on said shaft adjacent said one counting wheel member, a flag portion of said service indicating member extending in overlying relation to said counting wheel members, wiper spring means between said indicating member and said one counting wheel member to interconnect said members for rotation together in one direction from a first operative position to a second operative position in which said flag portion is visible to an observer, said wiper spring means being integrally attached at one end to one of said members and extending in a radial and axial direction toward the other of said members whereby limited axial movement of the second end of said wiper spring means is permitted by flexing of said wiper spring means, said other member carrying circumferentially spaced detent means engaged by the second end of said wiper spring means to interconnect said members for rotation together during movement between first and second operative positions, a stop washer mounted adjacent said indicating member and having opening means therein extending generally in a circumferential direction and with end portions defining its angular extent, a portion of said service indicating member engageable with said end portions of the opening means to control movement of the indicating member whereby movement of said indicating member is stopped in its second operative position and further movement of said one counting wheel member is permitted by the axial flexing of said wiper spring means and resultant disengagement of its second end from said circumferentially spaced detent means, manually operated reset means including a lever for counter-rotating said stop washer and connected service indicating member in a direction corresponding to movement from the second operative position back to the first operative position.

3. In an odometer assembly of the type having multiple counting wheel members rotatable upon a shaft in response to mileage intervals, service indicating means responsive to a predetermined rotation of one of the counting wheel members to move a signal into a visible position, said service indicating means including an indicating member mounted for rotation on said shaft adjacent said one counting wheel member, a flag portion of said service indicating means extending in overlying relation to said counting wheel members, wiper spring means between said indicating member and said one counting wheel member to cause rotative movement of the indicating member from a first operative position to a second operative position in which said flag portion is visible to an observer, said wiper spring means being integrally attached at one end to one of said members and extending in a radial and axial direction toward the other of said members whereby limited axial movement of the second end of the wiper spring means is permitted by flexing of said wiper spring means, said other member carrying circumferentially spaced detent means engaged by the second end of said wiper spring means to interconnect said members for rotation together during movement between first and second operative positions, a stop washer mounted adjacent said indicating member and having opening means therein extending generally in a circumferential direction with end portions defining its angular extent, a portion of said indicating member engageable with said end portions of the opening means to control movement of the indicator member whereby movement of said indicator member is stopped in its second operative position and further movement of said one counting wheel member is permitted by the axial flexing of said wiper spring means and resultant disengagement of its second end from said circumferentially spaced detent means, manually operated reset means including a lever mounted for manually actuated rotative movement on a shaft, said lever having a portion adjacent said stop washer and having an opening therein, a portion of said stop washer extending into said opening means to produce counter rotation of said stop washer and connected indicating member in a direction corresponding to movement of said indicating member from its second operative position back to its first operative position.

* * * * *